United States Patent
Fryc

(10) Patent No.: US 10,545,988 B2
(45) Date of Patent: Jan. 28, 2020

(54) SYSTEM AND METHOD FOR DATA SYNCHRONIZATION USING REVISION CONTROL

(71) Applicant: Red Hat, Inc., Raleigh, NC (US)

(72) Inventor: Lukas Fryc, Brno (CZ)

(73) Assignee: RED HAT, INC., Raleigh, NC (US)

( * ) Notice: Subject to any disclaimer, the term of this patent is extended or adjusted under 35 U.S.C. 154(b) by 424 days.

(21) Appl. No.: 14/633,018

(22) Filed: Feb. 26, 2015

(65) Prior Publication Data
US 2016/0253397 A1 Sep. 1, 2016

(51) Int. Cl.
*G06F 16/27* (2019.01)
*G06F 16/93* (2019.01)

(52) U.S. Cl.
CPC .............. *G06F 16/27* (2019.01); *G06F 16/93* (2019.01)

(58) Field of Classification Search
USPC ......................................................... 707/624
See application file for complete search history.

(56) References Cited

U.S. PATENT DOCUMENTS

| | | | |
|---|---|---|---|
| 7,246,255 B1 | 7/2007 | Heideman et al. | |
| 7,647,525 B2 | 1/2010 | Lecrone et al. | |
| 7,818,522 B2 | 10/2010 | Bartfai et al. | |
| 8,126,854 B1 * | 2/2012 | Sreedharan | G06F 11/1446 707/693 |
| 8,386,430 B1 * | 2/2013 | Myhill | G06F 11/1469 707/640 |
| 8,392,750 B2 | 3/2013 | Kaul | |
| 8,572,031 B2 | 10/2013 | Merriman et al. | |
| 8,775,373 B1 | 7/2014 | Ross et al. | |
| 9,800,659 B2 * | 10/2017 | Appel | H04L 67/1078 |
| 10,007,695 B1 * | 6/2018 | Baid | G06F 16/2308 |
| 10,209,979 B2 * | 2/2019 | Fryc | G06F 16/1873 |
| 2009/0217289 A1 * | 8/2009 | Onianwa | G06F 9/466 718/106 |

(Continued)

OTHER PUBLICATIONS

HP Serviceguard Extended Distance Cluster (EDC) with VxVM/CVM mirroring on HP-UX, Best practices, 26 Pages, 4AA1-8366ENW, May 2008.

(Continued)

*Primary Examiner* — Tamara T Kyle
*Assistant Examiner* — Raheem Hoffler
(74) *Attorney, Agent, or Firm* — Haynes and Boone LLP

(57) ABSTRACT

A system and method for data synchronization using revision control includes receiving, by a synchronization module being executed by one or more processors of a server, inbound edits to a shared document from a client, retrieving a first version of the shared document associated with the client from a revision history, updating the first version based on the inbound edits to create a second, adding the second version to the revision history when the second version is not included among a plurality of stored versions of the shared document in the revision history, and incrementing a reference counter that records a number of clients associated with the second version when the second version is included among the stored versions in the revision history. The revision history provides access to the stored versions of the shared document. The revision history includes version data used to access each stored version and the associated reference counters.

13 Claims, 6 Drawing Sheets

(56) References Cited

U.S. PATENT DOCUMENTS

| | | | |
|---|---|---|---|
| 2009/0228311 A1* | 9/2009 | Chieu | G06Q 10/063 705/7.11 |
| 2011/0161381 A1* | 6/2011 | Wang | G06F 17/30088 707/814 |
| 2012/0192064 A1* | 7/2012 | Antebi | G06Q 10/10 715/255 |
| 2013/0138607 A1 | 5/2013 | Bashyam et al. | |
| 2013/0262403 A1* | 10/2013 | Milousheff | G06F 16/2365 707/691 |
| 2014/0033068 A1* | 1/2014 | Gupta | G06Q 10/103 715/751 |
| 2014/0071135 A1* | 3/2014 | Morsi | G06Q 10/10 345/440 |
| 2014/0140354 A1 | 5/2014 | Mormina et al. | |

OTHER PUBLICATIONS

Philipp Reisner, Rapid resynchronization for replicated storage Activity-logging for DRBD, 5 Pages, Jan. 27, 2004.

Using EMC Recoverpoint Concurrent Local and Remote for Operational and Disaster Recovery, Applied Technology, 29 Pages, May 2012.

* cited by examiner

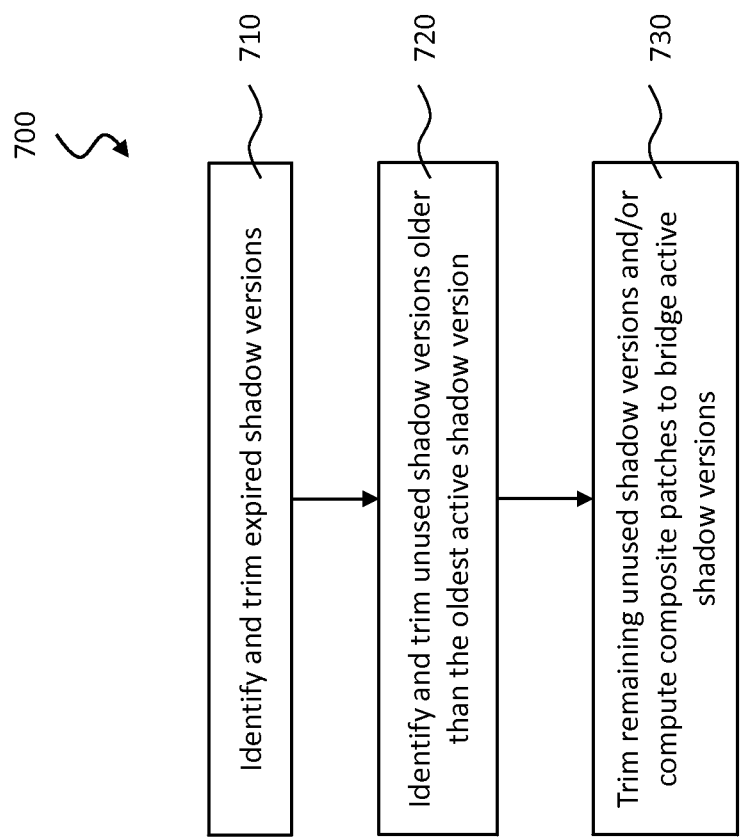

SYSTEM AND METHOD FOR DATA SYNCHRONIZATION USING REVISION CONTROL

RELATED APPLICATIONS

The present disclosure is related to concurrently filed U.S. Non-provisional patent application Ser. No. 14/633,077 entitled "System and Method for Distributed Revision Control", which is hereby incorporated by reference in its entirety.

BACKGROUND

The present disclosure relates generally to computing systems, and more particularly to data synchronization using revision control.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transitory, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other over a network. In order to do so, a server or some other computing system may provide services for sharing documents, files, or other information among other computing devices or clients. The server may additionally provide services to synchronize modifications made to a shared document by one or more of the clients. According to some types of synchronization services, the server may maintain one or more unique copies of the shared document for each client that is using the shared document at a given time. These copies enable the server to retrieve and/or update the state of the client's version of the document based on information provided by the client, such as a version number and/or a client identifier. In such systems, the number of copies of the shared document stored by the server increases as the number of clients increases. Because the server has limited memory resources, maintaining one or more unique copies of a shared document for each client limits the scalability and efficiency of the synchronization process.

Accordingly, it would be desirable to provide systems and methods to reduce the memory requirements and thus improve the scalability and efficiency of data synchronization systems and processes.

SUMMARY

According to one example, a method of data synchronization includes receiving, by a synchronization module being executed by one or more processors of a server, inbound edits to a shared document from a client, retrieving a first version of the shared document associated with the client from a revision history, updating the first version based on the inbound edits to create a second version, adding the second version to the revision history when the second version is not included among a plurality of stored versions of the shared document in the revision history, and incrementing a reference counter that records a number of clients associated with the second version when the second version is included among the stored versions in the revision history. The revision history provides access to the plurality of stored versions of the shared document. The revision history includes version data used to access each stored version and the associated reference counters.

According to another example, a data synchronization system includes a synchronization module executed by one or more processors of a server and a revision history configured to provide access to a plurality of stored versions of a shared document. The revision history includes version data used to access each stored version and reference counters that record a number of clients associated with each stored version. The data synchronization system is configured to receive, by the synchronization module, inbound edits to the shared document from a client, retrieve a first version of the shared document associated with the client from the revision history, update the first version based on the inbound edits to create a second version, add the second version to the revision history when the second version is not included among the stored versions in the revision history, and increment the reference counter associated with the second version when the second version is included among the stored versions in the revision history.

According to yet another example, a non-transitory machine-readable medium includes a plurality of machine-readable instructions which when executed by one or more processors associated with a server are adapted to cause the one or more processors to perform a method. The method includes receiving inbound edits to a shared document from a client, determining a first version identifier that identifies a first version of the shared document associated with the client, retrieving the first version from a revision history using the first version identifier, updating the first version based on the inbound edits to create a second version, determining a second version identifier that identifies the second version, adding the second version to the revision history when the second version is not included among a plurality of stored versions of the shared document in the revision history, and incrementing the reference counter associated with the second version when the second version is included among the stored versions in the revision history. The revision history provides access to the plurality of stored versions of the shared document. The revision history includes version identifiers corresponding to each stored version, version data used to access each stored version, and reference counters that record a number of clients associated with each stored version. The second version identifier is used to determine whether the second version is included among the stored versions in the revision history. The version identifiers include hash values of each stored version.

BRIEF DESCRIPTION OF THE DRAWINGS

FIG. 7 is a simplified diagram of a method of garbage collection according to some examples.

Figure 1:
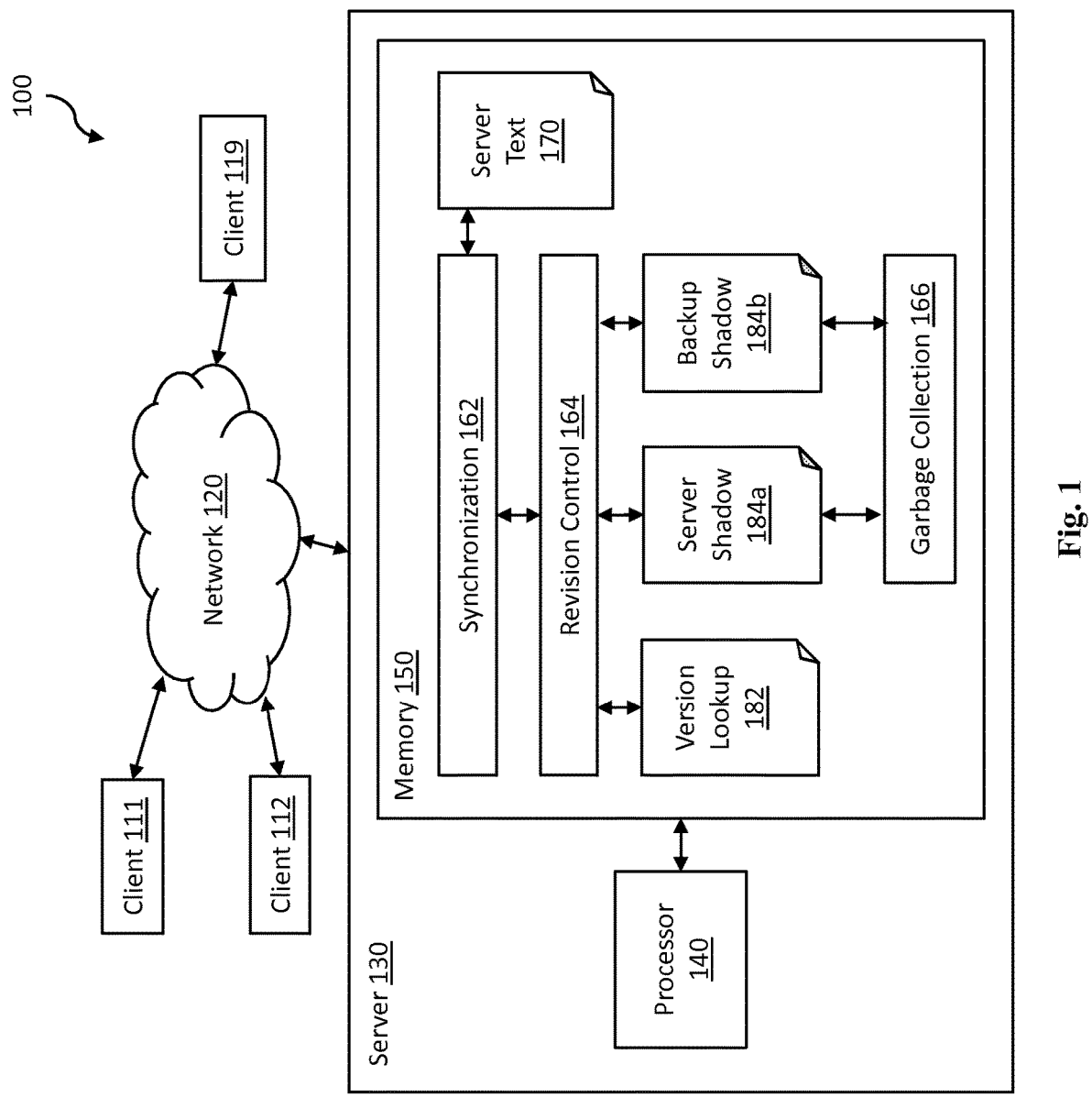
FIG. 1 is a simplified diagram of a data synchronization system according to some examples.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

A server may provide services to synchronize modifications made to a shared document by one or more clients. For example, a form of service for keeping documents synchronized is demonstrated by Differential Synchronization (DS). (Fraser, N. "Differential Synchronization." *DocEng* '09, the content of which is incorporated herein by reference in its entirety.) In DS, a client may modify a shared document and submit the modifications to a server in the form of edits. Edits record the differences between a client's original and modified copies of the shared document and may be computed, for example, by using a diff utility. The server then applies the received edits to one or more copies of the shared document maintained on the server, for example, by using a patch utility. After the server applies the edits received from the client, a similar reverse process is used to send edits received from other clients at the server to the client, thereby completing a synchronization cycle. At least one of the copies of the shared document maintained by the server, a 'server shadow,' is unique for each client. That is, the server maintains a separate server shadow for each client that is using the DS service.

Thus, in some synchronization systems, such as a system implementing DS, the server maintains one or more copies of a shared document for each client in the synchronization system. Because the server has limited memory resources, maintaining one or more copies of a shared document per client limits the scalability and efficiency of the synchronization system. As the number of clients grows, so does the number of copies of the shared document stored at the server. Among the copies of the shared document stored at the server, some of the copies may be redundant. For example, in DS, multiple clients may be associated with identical shadows, such as server shadows and/or backup shadows, at a given time. Redundancies in DS may be especially common when groups of clients synchronize with a server on similar time scales. For example, a server may share a document among a first group of clients with permanent connections, such as desktop computers, and a second group of clients with sporadic connections, such as mobile devices. Some synchronization systems may implement techniques that reduce the number of identical copies of a shared document stored by the server. In some examples, such techniques may be based on improved versions of revision control and garbage collection methods.

FIG. 1 is a simplified diagram of a data synchronization system 100 according to some examples. One or more clients 111-119 are connected through a network 120 to a server 130. In some examples, each of the clients 111-119 may be a computing device, a virtual machine, an application running on a computing device or virtual machine, and/or the like. Network 120 may be any kind of network including a local area network (LAN), such as an Ethernet, and/or a wide area network (WAN), such as the Internet. In some examples, server 130 may be a standalone workstation, a cluster, a production server, within a virtual machine, and/or the like. Server 130 includes a processor 140 coupled to memory 150. In some examples, processor 140 may control operation and/or execution of hardware and/or software on server 130. Although only one processor 140 is shown, server 130 may include multiple processors, CPUs, multi-core processors, field programmable gate arrays (FPGAs), application specific integrated circuits (ASICs), and/or the like. Memory 150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 150 stores a synchronization module 162, a revision control module 164, and a garbage collection module 166. Synchronization module 162 is configured to share documents, files, and/or other data among the one or more clients 111-119. Synchronization module 162 is further configured to synchronize the shared copies of the document when the data is modified by the one or more clients 111-119. In some examples, the shared document may include any type of formatted data, including text, eXtensible Markup Language (XML), JavaScript Object Notation (JSON), and/or any other data format. In some examples, synchronization module 162 may be configured to implement a modified version of the Differential Synchronization (DS) method. In DS, during synchronization with clients 111-119, synchronization module 162 may request to access and/or update one or more copies of the shared document stored in memory 150, including server text 170 and at least one shadow, such as a server shadow and/or a backup shadow. Server text 170 is a central copy of the shared document that incorporates the cumulative effects of the modifications submitted to server 130 from the clients 111-119 up to the present. Meanwhile, server and/or backup shadows are client-specific copies of the shared document that incorporate the modifications submitted to server 130 as of the last time a particular client synchronized with server 130. Because the clients 111-119 may generally synchronize with server 130 at different times from one another, different clients may use different shadow versions at a given time.

In order to access and/or update one or more shadow versions stored in memory 150, synchronization module 162 is configured to store and retrieve the shadows through revision control module 164. In some examples, revision control module 164 may be configured to identify and/or track the shadow version associated with each of the clients 111-119 using a version lookup table 182. In some examples, revision control module may receive the identity of the shadow version associated with each of the clients 111-119 from an external source, in which case version lookup table 182 may be omitted. Revision control module 164 may subsequently retrieve the shadow version from a revision history, such as a server shadow revision history 184a and/or a backup shadow revision history 184b. In some examples, garbage collection module 166 may also interface with revision histories 184a and/or 184b in order to free memory resources of memory 150 by removing unused, little used, redundant, and/or expired versions of the respective shadows.

As discussed above and further emphasized here, FIG. 1 is merely an example which should not unduly limit the scope of the claims. One of ordinary skill in the art would recognize many variations, alternatives, and modifications. In some examples, other architectures may be used with modules 162, 164, and 166. For example, revision control module 164 may be a sub-module of synchronization module 162 or vice versa. In some examples, modules 162, 164, and 166 may be hosted in one or more virtual machines and/or Java virtual machines running on server 130. In some examples, memory 150 may include more or less than the two revision histories 184a and 184b depicted in FIG. 1. In some examples, synchronization module 162 may access server text 170 through revision control module 164 rather than via direct access. In some examples, one or more portions of memory 150 may be hosted in server 130, coupled to server 130 using connectors and/or cabling, and/or coupled to server 130 over a network, such as network 120.

Figure 2:
FIG. 2 is a simplified diagram of a version lookup table according to some examples.

FIG. 2 is a simplified diagram of a version lookup table 182 according to some examples. Version lookup table 182 is merely depicted as a table for simplicity, and may alternately be configured as an array, dictionary, linked list, or any other data structure or combination of data structures suitable for storing and accessing the data entries described herein. In some examples, version lookup table 182 may be stored in a database, such as a SQL database, NoSQL database, XML database, and/or the like. In some examples, version lookup table 182 may include data entries for storing one or more client identifiers (IDs) 211-219 assigned to each of the one or more clients 111-119. A client identifier uniquely identifies a particular client among clients 111-119. A client identifier may include any known unique client identifier, such as a universally unique identifier (UUID), a media access control (MAC) address, an Internet Protocol (IP) address, a Transmission Control Protocol (TCP) or User Datagram Protocol (UDP) port number, a user name, a randomly assigned value, a hash value, and/or the like and/or a suitable combination thereof. In some examples, version lookup table 182 may be indexed by client identifiers 211-219.

Version lookup table 182 further includes data entries for storing version identifiers associated with each of the clients 111-119. In the example shown in FIG. 2, the version identifiers include server shadow version identifiers 221-229 and backup shadow version identifiers 231-239. A version identifier identifies the shadow version used by each of the one or more clients 111-119 at a given point in time. A version identifier may include any value that uniquely identifies a particular version of a shadow, such as a hash value, a sequence number, a timestamp, a piece of metadata, and/or the like and/or a suitable combination thereof. In some examples, when a version identifier includes a hash value, the hash value may include an MD5 hash and/or a SHA-1 hash. The version identifiers 221-229 and 231-239 may be updated as applicable when clients 111-119 update to different versions during a synchronization process.

As discussed above and further emphasized here, FIG. 2 is merely an example which should not unduly limit the scope of the claims. One of ordinary skill in the art would recognize many variations, alternatives, and modifications. In some examples, version lookup table 182 may include additional columns for storing metadata associated with each client, such as client version number 'n' and server version number 'm' in accordance with the DS method when used with guaranteed delivery. In some examples, version lookup table 182 may store version identifiers other than, and/or in addition to, the server shadow version identifiers 221-229 and the backup shadow version identifiers 231-239.

Figure 3:
FIG. 3 is a simplified diagram of a revision history according to some examples.

FIG. 3 is a simplified diagram of a revision history 184 according to some examples. In some examples, server shadow revision history 184a and/or backup shadow revision history 184b may be instances of revision history 184. Revision history 184 is merely depicted as a table for simplicity, and may alternately be configured as an array, dictionary, linked list, or any other data structure or combination of data structures suitable for storing and accessing the data entries described herein. In some examples, revision history 184 may be stored in a database, such as a SQL database, NoSQL database, XML database, and/or the like. Revision history 184 includes data entries for storing one or more version identifiers 311-319 assigned to each of the versions of a shadow stored in memory 150 at a given time. In some examples, revision history 184 may be indexed by the version identifiers 311-319. In general, the version identifiers 311-319 are referenced by the version identifiers 221-229 and/or 231-239 in version lookup table 182 described in FIG. 2. However, there may be scenarios where a version identifier referenced by version lookup table 182 does not exist in revision history 184, such as when a particular version still being used by the one or more clients 111-119 is removed by a garbage collection process. Similarly, there may be scenarios when one or more of the version identifiers 311-319 are not referenced by version lookup table 182, such as when no client is using a particular version at a given time.

Revision history 184 further includes data entries for storing version data 321-329 associated with each of the shadow versions. A version data entry is used to access and/or reconstruct a particular shadow version. For example, a version data entry may include the shadow itself, a compressed version of the shadow, a pointer to the shadow, a patch, and/or the like. When a version data entry includes a patch, the patch may further include data used to reconstruct a particular version of a shadow from a committed version of the shadow (a complete copy of the shadow) by using, for example, a patching utility. The format and content of the patch may vary based on the particular patching tools and techniques used by synchronization system 100 as well as the format and content of the shared document. The patch may, in some examples, be reversible (i.e., for each patch, a reverse patch can be computed) and/or cumulative (i.e., for a sequential series of patches, a composite patch can be computed). In some examples, the patch may be a forward patches that is applied to an older committed version of a shadow to reconstruct a more recent version. In other examples, the patch may be a reverse patch that is applied to a newer committed version of a shadow to reconstruct an older version. In some examples, the patch may be a composite patch that is applied directly to a committed version of the shadow to reconstruct a particular version. In other examples, a patch may be a non-composite patch that is applied along with a sequential series of patches to a committed version of the shadow to reconstruct a particular version. In some examples, caching techniques may be used to pre-compute one or more of the reconstructed versions from patches to improve the efficiency of shadow retrieval.

Revision history 184 further includes data entries for storing reference counters 331-339 associated with each of the shadow versions. A reference counter entry records the number of clients 111-119 associated with a shadow version at a given point in time. For example, the reference counter associated with a shadow version may be incremented each time a client is updated to that version from a different version during a synchronization process. Conversely, the reference counter associated with a shadow version may be decremented by one each time a client is updated from that version to a different version during the synchronization process. Reference counters 331-339 may further be incremented and/or decremented as applicable when a client joins or leaves the group of clients 111-119 participating in synchronization system 100. In some examples, a reference counter may include a list of client identifiers and/or the like rather than, and/or in addition to, a numerical count. Such a reference counter allows determination of both the number and identities of the clients associated with a shadow version at a given time. In some examples, a reference counter may include a flag and/or the like that indicates in a binary manner whether or not a shadow version is associated with one or more clients at a given time.

Revision history 184 further includes data entries for storing sequence metadata 341-349 associated with each shadow version. A sequence metadata entry records the time and/or order in which a shadow version was created, modified, and/or accessed. For example, a sequence metadata entry may include a timestamp and/or a sequence number. When sequence metadata includes a timestamp, the timestamp may further be generated based on a system clock of server 130 at the time when a shadow version was first entered into revision history 184. When sequence metadata includes a sequence number, the sequence number may further include a counter n indicating that a particular version was the nth version of the shadow created. In some examples, sequence metadata may include an event log that tracks multiple events associated with the shadow version, such as creation, modification, deletion, and/or access.

As discussed above and further emphasized here, FIG. 3 is merely an example which should not unduly limit the scope of the claims. One of ordinary skill in the art would recognize many variations, alternatives, and modifications. In some examples, revision history 184 may include additional columns for storing metadata associated with each version, such as the file size of the shadow version and/or the corresponding patch. In other examples, revision history 184 may include fewer columns than discussed above, as some of the data entries may not be used according to various examples.

Figure 4:
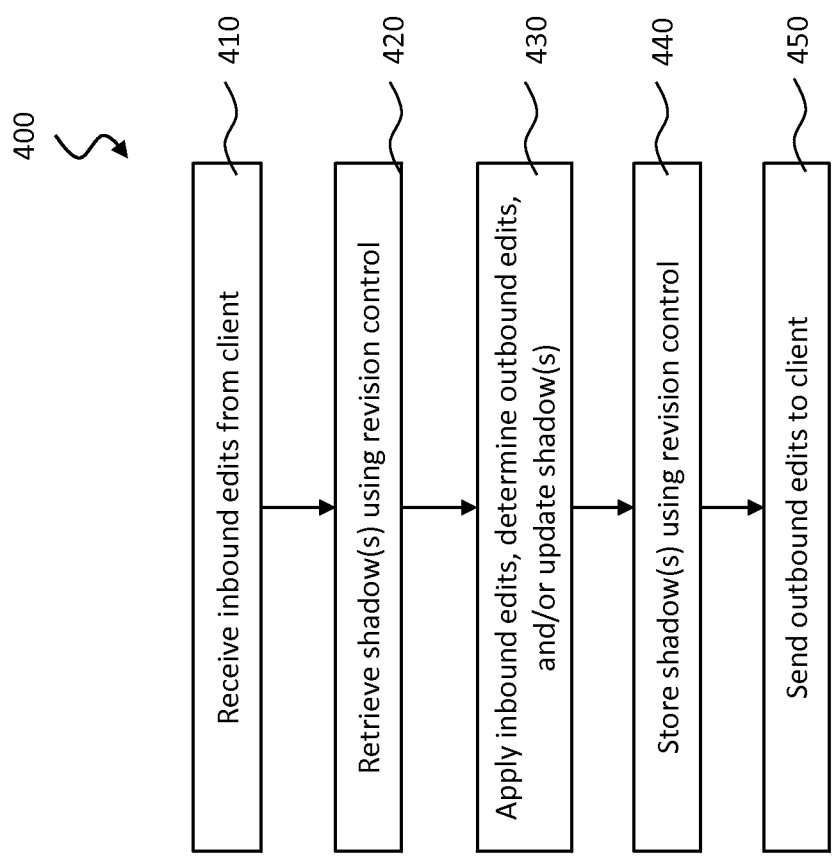
FIG. 4 is a simplified diagram of a method of synchronization handling according to some examples.

FIG. 4 is a simplified diagram of a method 400 of synchronization handling according to some examples. In some examples, one or more of the processes 410-450 of method 400 may be implemented, at least in part, in the form of executable code stored on non-transitory, tangible, machine readable media that when run by one or more processors (e.g., the processor 140 of server 130) may cause the one or more processors to perform one or more of the processes 410-450. In some examples, method 400 may be used by synchronization module 162 to receive and process synchronization requests.

At a process 410, inbound edits are received from a client. In some examples, the inbound edits may be received by a synchronization module, such as synchronization module 162, from a client, such as one of clients 111-119. In some examples, the inbound edits may be contained in one or more synchronization request messages sent by the client over a network, such as network 120, to a server, such as server 130. In some examples, the one or more synchronization request messages may be sent by the client when triggered by any suitable set of conditions, such a periodic timer, a user action, a push message from the server, and/or the like. In some examples, the inbound edits may include one or more differences between a client's original and modified copies of the shared document and may be computed, for example, by using a diff utility. In some examples, the inbound edits may be tagged with a client version number 'n' to verify the proper sequence of updates in a guaranteed delivery protocol, such as DS when used with guaranteed delivery. In some examples, the inbound edits may include one or more version identifiers that identify the one or more shadow versions associated with the client, as will be discussed below in relation to process 420.

Figure 5:
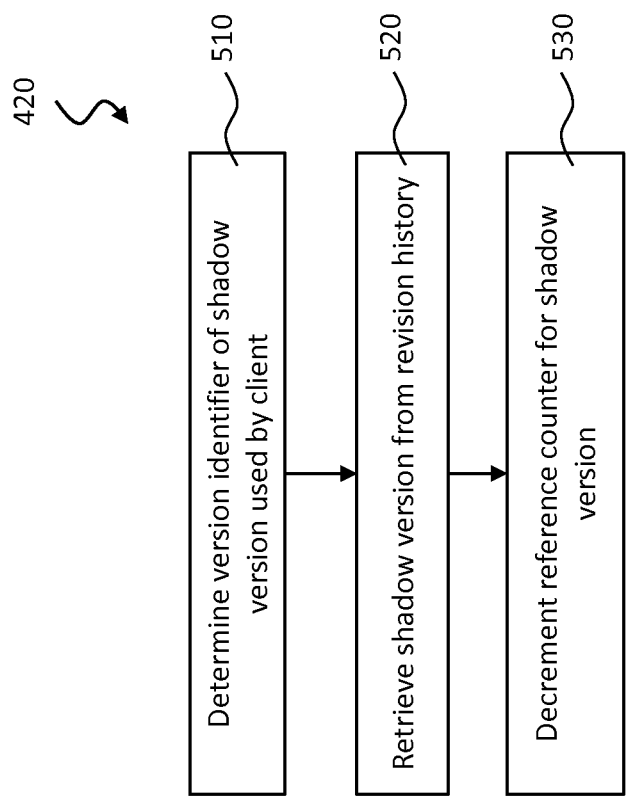
FIG. 5 is a simplified diagram of a method of retrieving a document from revision control according to some examples.

At a process 420, one or more shadows are retrieved using a revision control system. In DS, for example, the one or more shadows may include a server shadow and/or a backup shadow. In some examples, the synchronization module may retrieve the one or more shadows by using a revision control module, such as revision control module 164. FIG. 5 is a simplified diagram of a method for performing process 420 of retrieving a document from revision control according to some examples. In some examples, this method may be used by the revision control module to fulfill shadow retrieval requests from synchronization module.

At a process 510, a version identifier of the one or more shadow versions used by the client from which inbound edits were received during process 410 is determined. In some examples, the version identifier of the one or more shadow versions may be determined using a version lookup table, such as version lookup table 182. As discussed previously, in relation to FIG. 2, the version lookup table may be indexed using client identifiers that uniquely identify each client, such as client identifiers 211-219. The version lookup table may associate each client with one or more version identifiers that uniquely identify each shadow version, such as version identifiers 221-229 and/or 231-239. Thus, process 510 may include retrieving the one or more version identifiers (e.g. the server shadow version identifier and/or backup shadow version identifier) from the version lookup table based on the client identifier of the client from which inbound edits were received during process 410. In some examples, the version identifier of the shadow version may be provided by the client during process 410. For example, the version identifier may be included in the synchronization request message. In such examples, looking up the version identifier using the version lookup table may be omitted because equivalent information is instead provided by the client. For example, the client may compute and send one or more client-provided version identifiers that uniquely identify the one or more shadow versions associated with the client. In some examples, a client-provided version identifier may include a hash value, such as an MD5 hash and/or a SHA-1 hash, of a copy of the shadow version maintained by the client.

At a process 520, the shadow version identified during process 510 is retrieved from a revision history. In some examples, the revision history may be an instance of revision history 184, such as server shadow revision history 184a and/or backup shadow revision history 184b. As discussed previously, in relation to FIG. 3, the revision history may be indexed using version identifiers that uniquely identify each shadow version, such as version identifiers 311-319. The revision history stores version data that may be used to access and/or reconstruct each shadow version, such as version data 321-329. Thus, process 520 may include retrieving version data, such as version data 321-329, from the revision history at the version identifier determined during process 510. Depending on the format of the version data, process 520 may involve additional steps to reconstruct the shadow version from the version data. In some examples, where the version data includes a non-composite series of patches, process 520 may further include sequentially applying the one or more non-composite patches to a committed version of the shadow in order to reconstruct the requested version, for example, by using a patching utility. As discussed previously, in relation to FIG. 3, the particular technique used for applying the one or more patches may vary according to various examples.

At a process 530, a reference counter for the shadow version is decremented. In some examples, the reference counter may be an instance of reference counters 331-339 stored in the revision history. Decrementing the reference counter indicates that the client has been updated from the retrieved shadow version to a different shadow version. In some examples, process 530 may occur concurrently with or immediately after process 520. In other examples, process 530 may occur during a later stage of method 400, for example, after it is determined that the client is being updated to a version that is in fact different from the retrieved version. In other examples, process 530 may occur after the server receives acknowledgement from the client that the updates to the shadow version has been successfully received and applied, at which point the client is no longer relying on the server to manage the retrieved shadow version.

Referring back to FIG. 4, at a process 430, the inbound edits received during process 410 are applied, outbound edits are determined, and/or the one or more shadows retrieved during process 420 are updated. The inbound edits are applied in accordance with the synchronization protocol being used. For example, in DS, the inbound edits may be applied to the retrieved server shadow version by patching. In addition, the inbound edits may be applied to a server text copy of the shared document, such as server text 170. The inbound edits may be applied using any suitable patching utility, such as the patching utility used during process 520. The outbound edits are also determined in accordance with the synchronization protocol being used. In DS, the outbound edits record the differences, if any, between the updated version of server text and the updated version of server shadow after the inbound edits are applied. In some examples, the outbound edits may include one or more changes made to the server text by other clients since the last time the client synchronized using method 400. The outbound edits, like the inbound edits, may be computed by using a diff utility. In some examples, the outbound edits may be tagged with a server version number 'm' to verify the proper sequence of updates in a guaranteed delivery protocol, such as DS when used with guaranteed delivery. After the outbound edits are determined, the one or more retrieved shadows may be updated in accordance with the synchronization protocol being used. In DS when used with guaranteed delivery, for example, the server shadow is copied into the backup shadow associated with the client, and then the server text is copied into server shadow associated with the client.

Figure 6:
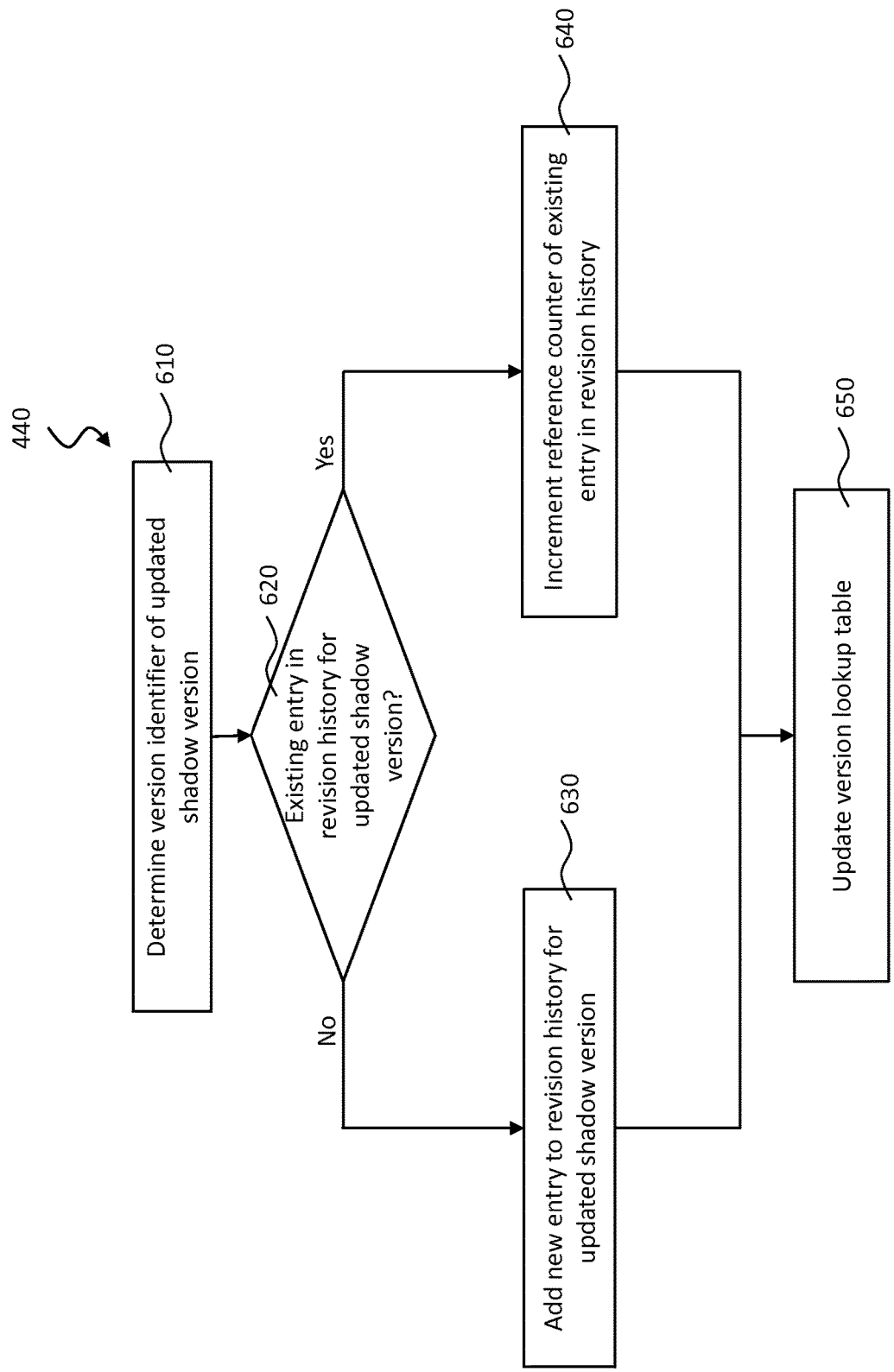
FIG. 6 is a simplified diagram of a method of storing documents according to some examples.

At a process 440, the updated shadow versions are stored using the revision control system. The stored shadows are, in general, the updated copies of the shadows that were retrieved using the revision control system during process 420 and updated during process 430. For example, in DS, the stored shadows may include the updated server shadow and/or backup shadow. FIG. 6 is a simplified diagram of a method for performing process 440 of storing shadows according to some examples. In some examples, this method may be used by the revision control module to fulfill shadow storage requests from the synchronization module.

At a process 610, a version identifier for the updated shadow version is determined. In some examples, the version identifier may be a value that uniquely identifies the updated shadow version. As discussed above, in relation to FIG. 2, the version identifier may include any value that uniquely identifies a shadow version, such as a hash value, a sequence number, a timestamp, a piece of metadata, and/or the like and/or a suitable combination thereof. When a version identifier includes a hash value, the hash value may include an MD5 hash and/or a SHA-1 hash. Thus, at process 610, the revision control module may be configured to compute and/or assign a unique version identifier to the updated shadow in accordance with the selected type of unique identifier.

At a process 620, it is determined whether an existing entry is stored in the revision history for the updated shadow. For example, when the version identifier determined during process 610 includes a hash value of the updated shadow, the revision control module may check for a matching hash value among version identifiers in the revision history. When an existing entry is not stored in the revision history, a new entry is added using a process 630. When an existing entry is stored in the revision history, a corresponding reference counter is incremented using a process 640.

At the process 630, a new entry is added to the revision history for the updated shadow version. In some examples, one or more of the fields in the revision history corresponding to the updated shadow version, such as the version identifier, version data, reference counter, and sequence metadata fields, may be populated. As discussed above, in relation to FIG. 3, the version data may include various types of data used to access and/or reconstruct the updated shadow version. Thus, the process of adding version data to the revision history may also vary accordingly, possibly involving additional steps and/or additional modifications to various shadow versions in the revision history. For example, in the case where version data includes a patch, a diff between a committed version of the shadow and the updated version of the shadow may be computed. In some examples, a forward patch is provided by the diff operation and stored in the version data entry of the updated shadow version in the revision history. In these cases, future requests to retrieve the updated shadow version from the revision history may apply the forward patch to an older committed version. In some examples, a reverse patch may be provided by the diff operation. In these cases, the reverse patch may be stored in the version data entry of an existing committed version, and the updated shadow version may replace the existing committed version. Older shadow versions may then be retrieved by applying reverse patches sequentially to the new committed version. The reference counter and sequence metadata values corresponding to the shadow version also may be populated at process 630. Because the updated shadow version is new, the reference counter is set to a value of one. As discussed previously, in relation to FIG. 3, the value set for the sequence metadata entry may vary depending on the type of sequence metadata being used. In some examples, the sequence metadata value may be a timestamp set to the current time by using a system clock of the server. In other examples, the sequence metadata value may be a sequence number set to a value one more than the highest value among the sequence numbers for the other shadow versions in the revision history. After adding the new entry, the version lookup table may be updated using a process 650.

Alternately, when an existing entry is found during process 620, a new entry for the updated shadow version may not be added to the revision history. Instead, at process 640, the reference counter of the existing entry in the revision history may simply be incremented. Incrementing the reference counter indicates that an additional client is now using the shadow version stored in the existing entry. In some examples, the sequence metadata of the existing version may be updated at process 640. As discussed previously, in relation to FIG. 3, the value of the sequence metadata entry may vary depending on the type of sequence metadata being used. In some examples, the sequence metadata value may be a timestamp set to the current time by using a system clock of the server. In other examples, the sequence metadata value may be a sequence number set to a value one more than the highest value among the sequence numbers for the other shadow versions in the revision history. After updating the existing entry, the version lookup table may be updated using a process 650.

Whether or not a match was found during process 620, at process 650, the version lookup table may be updated. In some examples, updating the version lookup table may include replacing the version identifier entry for the client with the version identifier of the updated shadow version. Thus, future requests to retrieve the version identifier for the client from the version lookup table return the version identifier of the updated shadow version rather than the old shadow version. In some examples, process 650 may be omitted, such as when a client-provided version identifier is used resulting in a version lookup table not being maintained, as discussed previously in relation to process 410.

Referring back to FIG. 4, at a process 450, outbound edits determined during process 430 are sent to the client. In some examples, the outbound edits may be sent to the client through the network. In some examples, the outbound edits may be sent in one or more synchronization response messages sent to the client. This process, once finished, completes a full synchronization cycle with the client.

As discussed above and further emphasized here, FIGS. 4-6 are merely examples which should not unduly limit the scope of the claims. One of ordinary skill in the art would recognize many variations, alternatives, and modifications. For example, at process 440, updated shadow versions may be stored in the revision history without checking for an existing entry during process 620. In this case, process 440 may store redundant versions in the revision history that may be removed later, for example, by using a garbage collection module, such as garbage collection module 166. In other examples, various steps may be added or removed to each process of method 400 to account for special cases and/or exceptions. An example of a special case may include a client requesting an update from the server at process 410 without sending any edits, in which case one or more processes may be skipped, simplified, or otherwise suitably altered. Other similar special cases may include a client requesting to join and/or disconnect from synchronization system 100, which may similarly be addressed by simple modifications to method 400. An example of an exception may include attempting to retrieve a shadow version that no longer exists in the revision history, such as an expired version, in which case one or more processes may be added to method 400 in order to recover the missing shadow version information from the client. In fact, when a client or group of clients connects infrequently to server 130 and often requests expired versions of a shadow, the synchronization module may be configured to fall back to a more optimal synchronization method when interacting with such clients. For example, the synchronization module may use the DS method for clients requesting frequent synchronization and use a fallback protocol for clients making sporadic synchronization requests.

FIG. 7 is a simplified diagram of a method 700 of garbage collection according to some examples. In some examples, method 700 may be used by a garbage collection module, such as garbage collection module 166, to remove unused, little used, redundant, and/or expired shadow versions from a revision history. In some examples, the revision history may be an instance of revision history 184, such as server shadow revision history 184*a* and/or backup shadow revision history 184*b*. The garbage collection module may use method 700 when triggered by any suitable set of conditions, such a periodic timer and/or an alert that a memory, such as memory 150, is approaching full capacity. In some examples, method 700 may be used according to a dynamic set of conditions based on, for example, the availability of processor and/or memory resources, the number of clients, the size of the shared document, and/or any other relevant factors and/or combinations thereof.

At a process 710, expired shadow versions in the revision history are identified and trimmed. In some examples, expired shadow versions may be identified by comparing sequence metadata associated with each shadow version in the revision history, such as sequence metadata entries 331-339, to a predetermined threshold. For example, a shadow version may be identified as expired when a shadow version was created before the predetermined threshold. In this case, the predetermined threshold may represent a duration, such as one month or one year before the present, or alternately may represent a cutoff date. In another example, a shadow version may be identified as expired when a shadow version is one of the last n recently created shadow versions. In this case, the predetermined threshold may represent n, i.e., the number of recent versions to retain. In some examples, the predetermined threshold may be a more complex set of conditions that combine, for example, aspects of each of the examples above. In some examples, the predetermined threshold may be a fixed value. In other examples, the predetermined threshold may be dynamically configured based on, for example, the availability of processor and/or memory resources, the number of clients, the size of the shared document, and/or any other relevant factors and/or combinations thereof.

Once identified, expired shadow versions in the revision history are trimmed. In general, trimming an expired shadow version releases at least a portion of the memory resources that had been dedicated to that shadow version. This can be accomplished in a variety of ways. In some examples, trimming an expired shadow version may include deleting each of or part of the data entries in the revision history associated with an expired shadow version from memory entirely. In other examples, trimming an expired shadow version may include moving data associated with the shadow version from a high-speed memory, such as random access memory (RAM), to a secondary memory, such as a magnetic disk. In some examples, trimming an expired shadow version may include deleting a complete copy of the shadow stored in the version data entry in the revision history and replacing the entry with a compressed version or a reduced-size patch. In some examples, the expired shadow versions may no longer be retrieved from the revision history after trimming. In some examples, the shadow versions may remain available for retrieval after trimming, although the retrieval process, such as process 420, may include one or more additional steps such as fetching the document from secondary memory, decompression and/or patch application.

At a process 720, unused shadow versions in the revision history that are older than the oldest active shadow version are identified and trimmed. In some examples, unused shadow versions may be identified by comparing reference counters associated with each shadow version in the revision history, such as reference counter entries 321-329, to a predetermined threshold. For example, the predetermined threshold may be zero, in which case unused versions that are not associated with any clients at a given time are identified as unused. Alternately, the predetermined threshold may be larger than zero, in which case versions currently in use by fewer clients than the predetermined threshold are identified as unused. Shadow versions in use by more clients than the predetermined threshold are identified as active. A second condition for trimming at process 720 is that a shadow version identified as unused is older than the oldest active shadow version. To make this determination, the oldest active shadow version among active shadow versions is identified, for example, by checking the sequence metadata. The unused shadow used versions that are determined to be older than the oldest active version may then be trimmed from revision history in a similar manner to process 710. The unused shadow versions that are determined not to be older than the oldest active version may be retained in memory or may be trimmed using a process 730.

At the process 730, one or more remaining unused shadow versions after processes 710 and 720 may also be trimmed. When the version data associated with the shadow versions in the revision history includes non-composite patches, process 730 may include computing cumulative patches to bridge active shadow versions. Because patches associated with unused shadow versions may bridge a pair of active shadow versions, the cumulative patches retain the patching information used to reconstruct the active shadow versions that had been stored in association with the unused shadow version. In some examples, the cumulative patches replace one or more of the patches associated with active shadow versions in the revision history. Once the cumulative patches are computed and stored, the unused shadow versions and/or their respective patches may be trimmed in a similar manner to processes 710 and 720.

As discussed above and further emphasized here, FIG. 7 is merely an example which should not unduly limit the scope of the claims. One of ordinary skill in the art would recognize many variations, alternatives, and modifications. For example, processes 710-730 may be performed concurrently, sequentially, and/or independently of one another. In some examples, the predetermined thresholds used during processes 710-730 to determine whether a particular shadow version should be trimmed may be combined into a more complex condition or set of conditions used to make the determination. For example, an aggregated metric based on the sequence metadata, the reference counter, and/or other data and/or metadata associated with each shadow version may be computed and compared to a corresponding aggregated threshold value to determine whether a version should be trimmed. In another example, when the predetermined threshold for determining whether a shadow version is unused is greater than zero, and a shadow version is determined to be unused even though it is associated with one or more clients, then a second condition, such as a condition based on the sequence metadata of the version, may be used to determine if the version should be trimmed. Thus, for example, a shadow version that is used by only a few clients may be trimmed if it is more than a few months old but may not be trimmed if it was created in the last few days, while a shadow version that is used by many clients may not be trimmed in either case.

Further, different variants of method 700 may be performed depending on the system status and/or the content of the revision history at a given time. For example, an aggressive variant of method 700 may be performed when memory resources are constrained and/or when revision history 184 contains non-critical data. The aggressive variant may include performing processes 710-730 using threshold values that result in a large number of shadow versions being trimmed. Conversely, a passive variant of method 700 may be performed when memory resources are not constrained and/or when the revision history contains critical data. The passive variant may include performing a subset of processes 710-730 and/or using threshold values that result in fewer shadow versions being trimmed.

Method 700 may further include additional processes, such as dispatching an alert message to the revision control module when a version is removed that is still in use by one or more clients and/or trimming duplicate shadow versions from the revision history. In some examples, method 700 may be configured to halt once a predetermined number of versions are trimmed or a predetermined amount of memory is released. For example, method 700 may be performed iteratively using progressively more aggressive threshold values until the predetermined criteria for halting is reached. In other examples, the threshold values may include ranges of values for which different trimming techniques may be used. For example, shadow versions ranging between one month and one year old may be trimmed by transfer from a primary to secondary memory and/or may continue to be accessible through the revision history, while shadow versions older than one year may be trimmed by permanent deletion and/or may no longer be accessible through the revision history.

Some examples of server 130 and/or memory may include non-transitory, tangible, machine readable media that include executable code that when run by one or more processors (e.g., processor 140) may cause the one or more processors to perform the processes of methods 400-700 as described above. Some common forms of machine readable media that may include the processes of methods 400-700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method of data synchronization, the method comprising:
   receiving, by a synchronization module being executed by one or more processors of a server, inbound edits to a shared document from a client;
   retrieving a first version of the shared document associated with the client from a revision history, the revision history providing access to a plurality of stored versions of the shared document, wherein the revision history comprises:
     version data used to access each stored version;
     reference counters, each respective reference counter being associated with a respective version of the plurality of stored versions of the shared document and recording a number of clients whose current version of the shared document is the respective version of the shared document; and
     version identifiers that uniquely identify each stored version, wherein the version identifiers include hash values of each stored version;
   updating the first version based on the inbound edits to create a second version;
   determining whether the second version is included among the stored versions in the revision history;
   incrementing the respective reference counter associated with the second version when the second version is included among the stored versions in the revision history;
   decrementing the respective reference counter associated with the second version when one of the number of clients updates the shared document to a different version;
   trimming a first one of the stored versions in the revision history when the respective reference counter associated with the first one of the stored versions is below a predetermined threshold, wherein trimming the first one of the stored versions comprises computing one or more composite patches based on a patch associated with the first one of the stored versions; and
   halting once a predetermined number of versions are trimmed.

2. The method of claim 1, wherein the method is based on differential synchronization, and wherein the version of the shared document associated with the client is a server shadow.

3. The method of claim 1, further comprising:
   determining a first version identifier that identifies the first version, the first version identifier being used to retrieve the first version from the revision history; and
   determining a second version identifier that identifies the second version, the second version identifier being used to determine whether the second version is included among the plurality of stored versions in the revision history.

4. The method of claim 3, wherein the first version identifier is determined from information provided by the client.

5. The method of claim 3, wherein the first version identifier is determined by looking up the first version identifier using a version lookup table, the version lookup table being configured to associate clients with version identifiers.

6. The method of claim 1, wherein sequence metadata associated with the first one of the stored versions indicates that the first one of the stored versions is older than an oldest active stored version, the oldest active stored version being an oldest stored version in the revision history that is associated with the respective reference counter above the predetermined threshold.

7. The method of claim 1, wherein trimming the first one of the stored versions comprises moving the first one of the stored versions from a primary memory to a secondary memory.

8. The method of claim 1, further comprising trimming a first one of the stored versions in the revision history when sequence metadata associated with the first one of the stored versions indicates that the first one of the stored versions is older than a predetermined threshold.

9. The method of claim 8, wherein trimming the first one of the stored versions comprises moving the first one of the stored versions from a primary memory to a secondary memory.

10. A data synchronization system comprising:
    a synchronization module executed by one or more processors of a server; and
    a revision history configured to provide access to a plurality of stored versions of a shared document, wherein the revision history comprises version data used to access each stored version and reference counters, each respective reference counter being associated with a respective version of the plurality of stored versions of the shared document and recording a number of clients whose current version of the shared document is the respective version of the shared document, wherein the revision history further comprises version identifiers that uniquely identify each stored version, the version identifiers including hash values of each stored version;
    wherein the data synchronization system is configured to:
      receive, by the synchronization module, inbound edits to the shared document from a client;
      retrieve a first version of the shared document associated with the client from the revision history;
      update the first version based on the inbound edits to create a second version;
      determine whether the second version is included among the stored versions in the revision history;
      increment the respective reference counter associated with the second version when the second version is included among the stored versions in the revision history;

decrement the respective reference counter associated with the second version when one of the number of clients updates the shared document to a different version;

trim a first one of the stored versions in the revision history when the respective reference counter associated with the first one of the stored versions is below a predetermined threshold, wherein trimming the first one of the stored versions comprises computing one or more composite patches based on a patch associated with the first one of the stored versions; and halt once a predetermined number of versions are trimmed.

11. The data synchronization system of claim 10, wherein the data synchronization system is further configured to trim a first one of the stored versions in the revision history when sequence metadata associated with the first one of the stored versions indicates that the first one of the stored versions is older than a predetermined threshold.

12. The data synchronization system of claim 1, wherein sequence metadata associated with the first one of the stored versions indicates that the first one of the stored versions is older than an oldest active stored version, the oldest active stored version being an oldest stored version in the revision history that has the respective reference counter above the predetermined threshold.

13. A non-transitory machine-readable medium comprising a plurality of machine-readable instructions which when executed by one or more processors associated with a server are adapted to cause the one or more processors to perform a method comprising:

receiving inbound edits to a shared document from a client;

determining a first version identifier that identifies a first version of the shared document associated with the client, the first version identifier including a hash value of the first version;

retrieving the first version from a revision history using the first version identifier, the revision history providing access to a plurality of stored versions of the shared document, wherein the revision history comprises version identifiers corresponding to each stored version, the version identifiers including hash values of each stored version, version data used to access each stored version, and reference counters, each respective reference counter being associated with a respective version of the plurality of stored versions of the shared document and recording a number of clients whose current version of the shared document is the respective version of the shared document;

updating the first version based on the inbound edits to create a second version;

determining a second version identifier that identifies the second version, the second version identifier being used to determine whether the second version is included among the stored versions in the revision history, the second version identifier including a hash value of the second version;

determining whether the second version is included among the stored versions in the revision history; and incrementing the respective reference counter associated with the second version when the second version is included among the stored versions in the revision history;

decrementing the respective reference counter associated with the second version when one of the number of clients updates the shared document to a different version;

trimming a first one of the stored versions in the revision history when the respective reference counter associated with the first one of the stored versions is below a predetermined threshold, wherein trimming the first one of the stored versions comprises computing one or more composite patches based on a patch associated with the first one of the stored versions; and halting once a predetermined number of versions are trimmed.

* * * * *